W. H. ALLEN.
WAVE MOTOR.
APPLICATION FILED MAR. 9, 1911.

1,004,332.

Patented Sept. 26, 1911.
2 SHEETS—SHEET 1.

WITNESSES:
Elmer E. Rodabaugh
Mary G. Bowman

INVENTOR.
William H. Allen.
BY
A. B. Bowman
ATTORNEY.

W. H. ALLEN.
WAVE MOTOR.
APPLICATION FILED MAR. 9, 1911.
1,004,332.
Patented Sept. 26, 1911.
2 SHEETS—SHEET 2.
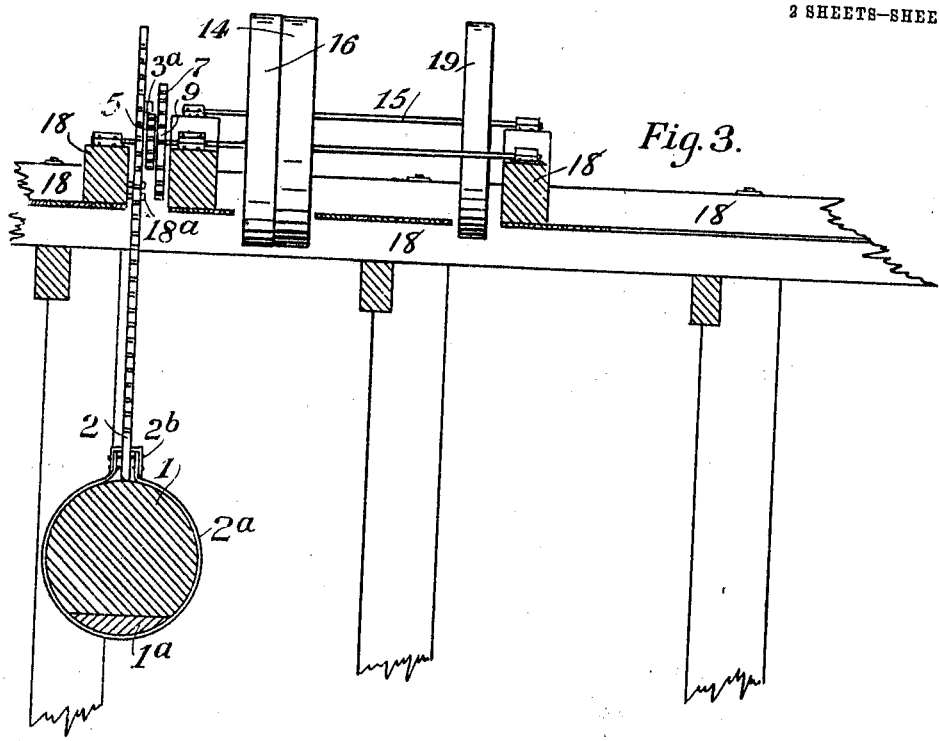
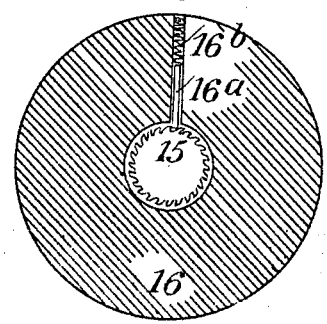
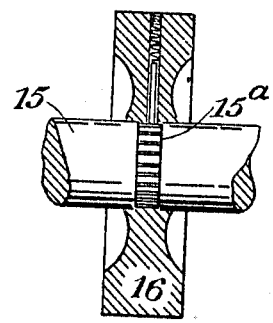
WITNESSES:
Elmer E. Rodabaugh
Mary C. Bowman.
INVENTOR.
William H. Allen
BY
A. B. Bowman
ATTORNEY.

UNITED STATES PATENT OFFICE.

WILLIAM H. ALLEN, OF SAN DIEGO, CALIFORNIA.

WAVE-MOTOR.

1,004,332.

Specification of Letters Patent.  Patented Sept. 26, 1911.

Application filed March 9, 1911.  Serial No. 613,280.

*To all whom it may concern:*

Be it known that I, WILLIAM H. ALLEN, a citizen of the United States, and a resident of San Diego, in the county of San Diego and State of California, have invented certain new and useful Improvements in Wave-Motors, of which the following is a specification.

My invention relates to wave motors of the floating buoy type and the objects are, first, to provide a mechanism that is simple of construction, durable and easily installed, second, to provide a means of transmitting power from the movement of the waves, third, to provide a simple means of engaging and disengaging the power shafts which operate in connection with the wave propelling mechanism.

With these and other objects in view, as will appear, my invention consists of certain novel features of construction, combination and arrangement of parts as will be hereinafter described in detail and particularly set forth in the appended claims, reference being had to the accompanying drawings and to the characters of reference thereon, which form a part of this specification, in which:—

Figure 1:
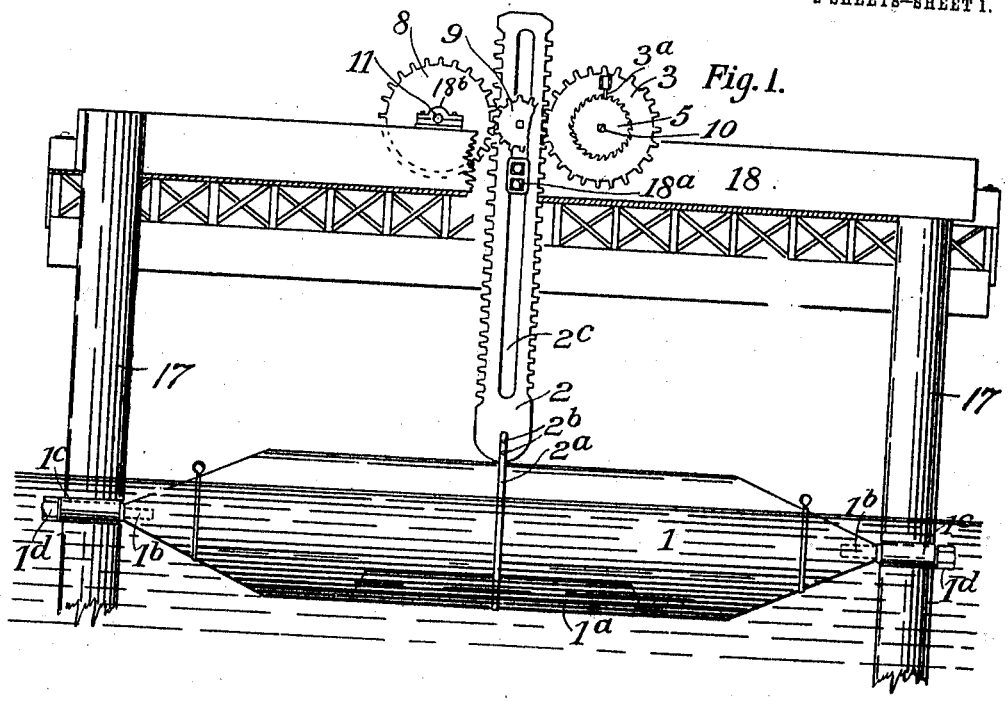
Figure 2:
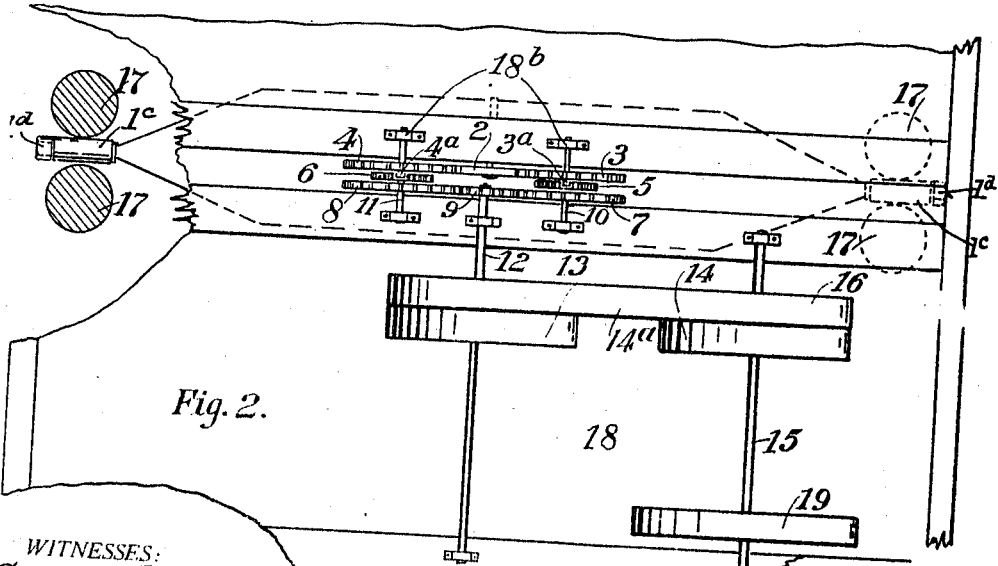

Figure 1 is a side elevational view of one unit of my mechanism shown in connection with a wharf to which it is connected, Fig. 2 is a top or plan view thereof showing parts of the wharf broken away, Fig. 3 is an elevational view at right angles to that of Fig. 1, Fig. 4 is a sectional view in detail of a ratchet pulley in connection with a portion of a shaft, and Fig. 5 is a transverse sectional view thereof.

Similar characters of reference refer to similar parts throughout the several views.

The float 1, vertical rack 2, loose gear 3, loose gear 4, ratchet wheel 5, ratchet wheel 6, gear 7, gear 8, intermediate gear 9, shaft 10, shaft 11, shaft 12, pulley 13, pulley 14, shaft 15, pulley 16 and fly wheel 19 constitute the principal parts of my invention.

The float 1 is cylindrically shaped, and tapered toward each end and is preferably made of a log, but may be of any material, and hollow, the principal object being to get a float of just sufficient weight to float nicely in the water. Set in the lower surface of this float is a weight 1$^a$ for the purpose of keeping that portion of the float down. In each end of the float is provided a shaft 1$^b$ upon which is revolubly mounted a roller 1$^c$ which is retained in its positions on said shaft by means of nut 1$^d$. These rollers are adapted to roll between two vertical piles 17, which are spaced apart, thus providing a way. Encircling the float 1 is a band 2$^a$ which connects at its top side with a two faced gear rack 2 by means of bolts 2$^b$. This gear rack extends vertically through the floor of a wharf 18 and is provided with a vertical slot 2$^c$. The rack 2 is adapted to reciprocate vertically on a guide 18$^a$ on the wharf. On each side of rack 2 and engaging with the rack teeth thereon are gears 3 and 4 which are loosely mounted on shafts 10 and 11, and said shafts are substantially mounted on the wharf 18 by means of boxes 18$^b$. Upon the said shafts 10 and 11 are rigidly mounted gears 7 and 8, and between gears 3 and 7 on shaft 10 and between gears 4 and 8 on shaft 11 are rigidly mounted ratchet wheels 5 and 6. These ratchet wheels 5 and 6 are adapted to engage with spring bolts 3$^a$ and 4$^a$ which are mounted on gears 3 and 4 and adapted to engage with the teeth on ratchet wheels 5 and 6 when in the position as shown in Fig. 1. Between the rigidly mounted gears 7 and 8 and engaging with the inner sides of said gears is intermediate gear 9 which is rigidly mounted upon shaft 12. On shaft 12 is mounted tight pulley 13 which connects with a loose pulley 14 and a ratchet pulley 16 by means of a belt 14$^a$. The pulleys 14 and 16 are mounted on a shaft 15 which is revolubly mounted on the wharf 18. On shaft 15 is also mounted fly wheel 19 which is for the purpose of retaining the momentum of said shaft. As shown best in Figs. 4 and 5 the shaft 15 is provided near the center of the pulley 16 mounted thereon, with ratchet teeth 15$^a$. Centrally located in said pulley, and adapted to engage with said ratchet teeth is a pin 16$^a$ in a hole in said pulley, in connection with a compression spring 16$^b$. This is for the purpose of allowing the shaft to revolve in the pulley at a greater speed than the pulley and in case the shaft is not revolving faster than the pulley, the pulley will carry the shaft with it at its full speed. This shaft 15 may be connected to any mechanism it is desired to drive, preferably an air compressor.

Though I have shown and described a particular construction and arrangement of parts, I do not wish to be limited to this particular construction and arrangement, but desire to include in the purview of my invention, particularly the construction and arrangement substantially as claimed. I have shown only one unit, but there may be a plurality,—all connected to one driven shaft.

It will be obvious that with the mechanism as constructed each vertical impulse of the wave will raise or lower the float 1, between the piles 17, carrying with it gear rack 2 which will revolve gears 3 and 4 which are connected to the ratchets 5 and 6 which in turn will cause the wheel 7 to revolve when the float is rising and the wheel 8 to revolve when the float is lowering as the teeth on the ratchets 5 and 6 are in opposite directions to each other. This will revolve shaft 12 through an intermediate gear 9 which in turn will revolve shaft 15, which may be connected to any driven mechanism.

Having thus described my invention, what I claim as new and desire to secure by Letters Patent is:—

1. A wave motor comprising a float, a plurality of shafts mounted thereon, a roller mounted on each of said shafts, a way adapted for each of said rollers, a double rack mounted on said float, gears in connection with said rack and ratchet wheels in connection with said gears, all substantially as set forth.

2. A wave motor comprising a cylindrically shaped float, a shaft mounted on each end thereof, a roller mounted on each of said shafts, a vertical way for each of said rollers, a double rack mounted on said float, gears in connection with said rack and ratchet wheels in connection with said gears, all substantially as set forth.

3. A wave motor comprising a cylindrically shaped float, a shaft mounted on each end thereof, a roller mounted on each of said shafts, a vertical way for each of said rollers, double gear and rack means for transmitting power to a shaft, and ratchet wheels in connection with said gears, all substantially as set forth.

4. A wave motor comprising a cylindrically shaped float, a shaft mounted on each end thereof, a roller mounted on each of said shafts, vertical ways for each of said rollers, a gear rack, loose gears in engagement with said gear rack, ratchet wheels in engagement with said loose gears, other gears rigidly mounted on the shafts carrying said ratchet wheels, an intermediate gear in connection with said rigidly mounted gears and a momentum retainer in connection therewith, all substantially as set forth.

5. A wave motor comprising a cylindrically shaped float, means for retaining it in a certain lateral position, a two faced vertical rack adapted to reciprocate vertically therewith, loose gears in connection with said rack, ratchets in connection with said loose gears, rigidly mounted gears in connection with said ratchets, an intermediate gear in connection with said rigidly mounted gears, a pulley provided with a ratchet in connection with said intermediate gear, and a loose pulley adjacent to said pulley mounted upon the same shaft, all substantially as set forth.

6. A wave motor comprising a cylindrically shaped float, means for retaining it in a certain lateral position, a two faced vertical rack adapted to reciprocate vertically therewith, loose gears in connection with said rack, ratchets in connection with said loose gears, rigidly mounted gears in connection with an intermediate gear, a tight pulley in connection with said intermediate gear, a loose pulley in connection with said other pulley mounted upon another shaft, a pulley mounted on said other shaft provided with means for allowing the shaft to revolve faster than the pulley and to prevent the pulley from revolving faster than the shaft, and a fly wheel mounted on said last mentioned shaft, the foregoing being but one unit of which there may be a plurality, all in connection with the latter mentioned shaft, all substantially as set forth.

In witness whereof, I have hereunto subscribed my name in the presence of two subscribing witnesses.

WILLIAM H. ALLEN.

Witnesses:
MARY A. BOWMAN,
ELMER E. RODABAUGH.